(12) United States Patent
Gao et al.

(10) Patent No.: US 10,954,784 B2
(45) Date of Patent: Mar. 23, 2021

(54) SHEARER CUTTING UNIT WITH DOUBLE-SPEED ROLLERS

(71) Applicant: SHANDONG UNIVERSITY OF SCIENCE AND TECHNOLOGY, Shandong (CN)

(72) Inventors: Kuidong Gao, Shandong (CN); Liqing Sun, Shandong (CN); Qingliang Zeng, Shandong (CN); Xin Zhang, Shandong (CN); Wenbo Xu, Shandong (CN); Liang Wang, Shandong (CN); Xiaodi Zhang, Shandong (CN)

(73) Assignee: SHANDONG UNIVERSITY OF SCIENCE AND TECHNOLOGY, Shandong (CN)

( * ) Notice: Subject to any disclaimer, the term of this patent is extended or adjusted under 35 U.S.C. 154(b) by 0 days.

(21) Appl. No.: 16/753,801

(22) PCT Filed: Apr. 23, 2018

(86) PCT No.: PCT/CN2018/084112
§ 371 (c)(1),
(2) Date: Apr. 6, 2020

(87) PCT Pub. No.: WO2019/109577
PCT Pub. Date: Jun. 13, 2019

(65) Prior Publication Data
US 2020/0263540 A1    Aug. 20, 2020

(30) Foreign Application Priority Data

Dec. 5, 2017   (CN) .......................... 201711266893.4

(51) Int. Cl.
*E21C 31/02* (2006.01)
*E21C 25/10* (2006.01)
(Continued)

(52) U.S. Cl.
CPC .............. *E21C 31/02* (2013.01); *E21C 25/10* (2013.01); *E21C 25/68* (2013.01); *E21C 31/08* (2013.01); *E21C 35/20* (2013.01); *E21C 35/22* (2013.01)

(58) Field of Classification Search
CPC ................................. E21C 31/00; E21C 31/02
See application file for complete search history.

(56) References Cited

U.S. PATENT DOCUMENTS 4,828,326 A * 5/1989 Schupphaus ............ E21C 31/00
299/42

FOREIGN PATENT DOCUMENTS

CN      202031587      11/2011
CN      102644461      8/2012
(Continued)

OTHER PUBLICATIONS

"International Search Report (Form PCT/ISA/210) of PCT/CN2018/084112", dated Aug. 6, 2018, with English translation thereof, pp. 1-6.

*Primary Examiner* — Janine M Kreck
(74) *Attorney, Agent, or Firm* — JCIP Global Inc.

(57) ABSTRACT

A shearer cutting unit with double-speed rollers includes a motor driving unit, a motor driving unit, a gear transmission unit and a roller output unit. The motor driving unit includes a left cutting motor and a right cutting motor which are both arranged in a cutting unit case and connected with the roller output unit in a transmission way through the gear transmission unit. The roller output unit comprises a middle output shaft (3-1), a far-end output shaft, a middle support frame, a middle roller, a far-end support frame and a far-end roller. A cutting roller is separated into two coaxially-rotating parts, and the two rollers can rotate in different speeds.

10 Claims, 6 Drawing Sheets

(51) Int. Cl.
*E21C 25/68* (2006.01)
*E21C 31/08* (2006.01)
*E21C 35/20* (2006.01)
*E21C 35/22* (2006.01)

(56) References Cited

FOREIGN PATENT DOCUMENTS

| | | | | |
|---|---|---|---|---|
| CN | 204140062 | 2/2015 | | |
| CN | 107829733 | 3/2018 | | |
| CN | 107905783 | 4/2018 | | |
| CN | 207499869 | 6/2018 | | |
| DE | 3148824 C1 * | 2/1983 | ............. | E21C 31/02 |
| DE | 3810374 C1 * | 11/1989 | ............. | E21C 27/02 |
| GB | 2161186 | 1/1986 | | |

* cited by examiner

US 10,954,784 B2

SHEARER CUTTING UNIT WITH DOUBLE-SPEED ROLLERS

CROSS-REFERENCE TO RELATED APPLICATION

This application is a 371 of international application of PCT application serial no. PCT/CN2018/084112, filed on Apr. 23, 2018, which claims the priority benefit of China application no. 201711266893.4, filed on Dec. 5, 2017. The entirety of each of the above mentioned patent applications is hereby incorporated by reference herein and made a part of this specification.

BACKGROUND

Technical Field

The invention relates to a thin seam coal shearer cutting unit with separated rollers having different speeds, and belongs to the technical field of coal mine machinery.

Description of Related Art

In recent years, the coal mining industry in China develops rapidly, and demands on various functions of mining machinery also go through quick changes. Shearers are one of the important equipment for mechanized and automated coal mine production. In thin seam coal mining at present, in order to increase the yield, thin seam coal double-roller shearers commonly used on fully-mechanized coal mining faces have a common web of over 600 mm. With larger web, the coal cutting amount also increases. According to theoretical analysis, rollers rotating at low speed facilities axial movement of the coal. However, low speed leads to low coal spreading speed of the rollers, poor coal charging effect of the shearers, and coal piece accumulation in the goaf when the mining height of the thin seam coal is small, thus resulting in severe float coal, and affecting traveling of the shearers and movement of the supports.

SUMMARY

Invention objective: in order to overcome the deficiencies in the existing technology, the invention provides a shearer cutting unit with double-speed rollers, which can realize that two rollers rotate coaxially in different speeds, among which, a far-end roller has higher rotation speed, higher coal cutting efficiency, smaller lead angle of the helical vanes and larger wrap angle, thereby providing better axial mobility, and a middle roller has lower rotation speed and larger spiral lead angle, and thus the middle roller can increase a tangential force and a projection speed, and help complete roller conveyance and coal loading in a better way.

Technical scheme: to achieve the objective, the invention adopts the following technical scheme.

A shearer cutting unit with double-speed rollers includes a cutting unit case, a motor driving unit, a gear transmission unit and a roller output unit. The motor driving unit comprises a left cutting motor and a right cutting motor, which are both arranged in the cutting unit case. The gear transmission unit comprises a left gear shaft, a first idle wheel, a right gear shaft, a second idle wheel, a main input shaft, a planetary gear speed reducer, a first stage gear shaft, a second stage gear shaft, an input gear, an output gear, a third stage linear shaft, a constant-speed gear, a speed distributing shaft, a main gear and an auxiliary gear which are all arranged inside the cutting unit case. The left gear shaft is connected with an output shaft of the left cutting motor in a matching manner, and a gear part of the left gear shaft is engaged with the first idle wheel. The first idle wheel is engaged with the gear part of the right gear shaft, and the right gear shaft is connected with an output shaft of the right cutting motor in a matching manner. The right gear shaft is further engaged with the second idle wheel, and the second idle wheel is further engaged with a gear part of the main input shaft. The main input shaft is a gear shaft, and one end of the main input shaft far from the gear part thereof is connected with an input shaft of the planetary gear speed reducer in a matching manner. The input shaft and an output shaft of the planetary gear speed reducer are in a same axial direction, and the output shaft of the planetary gear speed reducer is connected with the first stage gear shaft in a matching manner. The gear part of the first stage gear shaft is engaged with the input gear on the second stage gear shaft, and two gears are arranged on the second stage gear shaft, among the two gears, a gear with larger radius is the input gear, and a gear with smaller radius is the output gear. The output gear on the second stage gear shaft is engaged with the constant-speed gear on the third stage linear shaft, and the constant-speed gear is further engaged with the main gear on the speed distributing shaft. The roller output unit comprises a middle output shaft, a far-end output shaft, a concentric bearing pack, a locating bearing, a middle support frame, a middle roller, a far-end support frame, a far-end roller, a tail-end bearing pack and a locating sleeve. A gear part of the middle output shaft is engaged with the auxiliary gear on the speed distributing shaft, and a tooth number of the gear part is larger than a tooth number of the auxiliary gear. The middle output shaft is cylindrical, and the concentric bearing pack and the locating bearing are respectively fixed on shoulders of an inner wall and an outer wall of the middle output shaft. A tail end of the middle output shaft matches with an inner wall of the middle support frame, and an outer wall of the middle support frame is fixedly connected with the inner wall of the middle roller. The far-end output shaft is a gear shaft, the gear part of the far-end output shaft is engaged with the main gear, and a tooth number of the gear part of the far-end output shaft is smaller than a tooth number of the main gear. An end of the far-end output shaft far from the gear part thereof penetrates through the middle roller, the concentric bearing pack, the locating sleeve and the tail-end bearing pack in sequence and matches with the far-end support frame, and an outer wall of the far-end support frame is connected with an inner wall of the far-end roller in a matching manner.

Further, matching connections are realized between the left gear shaft and the output shaft of the left cutting motor, between the right gear shaft and the output shaft of the right cutting motor, and between the output shaft of the planetary gear speed reducer and the first stage gear shaft through splines. A spline groove is arranged at the end of the main input shaft far from the gear part thereof and is provided with a threaded hole, a through hole is formed in the input shaft and the output shaft of the planetary gear speed reducer, a bolt penetrating through the through hole is connected in the threaded hole and connected with the input shaft of the planetary gear speed reducer, and the planetary gear speed reducer matches with the main input shaft through a spline, to realize good transmission effect.

Further, a shoulder is arranged on a section at the end of the main input shaft far from the gear part thereof, and the shoulder is provided with a carrying sleeve. A carrying bearing pack is sleeved outside the carrying sleeve, and a bearing seat is arranged at an outer bearing ring thereof. A pair of threaded hole is formed in the bearing seat, and is fixedly connected with a locating fin plate installed on the cutting unit case through bolts. The carrying bearing pack supports one end of the main input shaft, and can bear large radial load, so as to protect the main input shaft, and well guarantee the coaxiality between the main input shaft and the input shaft of the planetary gear speed reducer. The locating fin plate is designed to lower the difficulty of bearing seat assembly, and to obtain better assembly precision.

Further, a tooth number of the input gear is 1.5-2.5 times of a tooth number of the gear on the first stage gear shaft. A diameter of the input gear is 1.5-2.5 times of a diameter of the output gear, and a module of the output gear is 1.5-2 times of a module of the input gear.

Further, the speed distributing shaft is a spindle, and two groups of double-row tapered roller bearing are installed on the spindle, each groups having two double-row tapered roller bearings, outer bearing rings of one group of double-row tapered roller bearing match with the auxiliary gear, and outer bearing rings of the other group of double-row tapered roller bearing match with the main gear. The main gear and the auxiliary gear are installed on the speed distributing shaft side by side, corresponding taper holes are formed on adjacent spoke surfaces of the main gear and the auxiliary gear, and the main gear and the auxiliary gear are connected into a whole through matching between a double-cone locating pin and the taper holes in the main gear and the auxiliary gear. The double-cone locating pin ensures synchronous rotation of the main gear and the auxiliary gear which are compact and easy to disassemble, and can transmit a larger driving force. The separated rollers can have different rotation speed differences through replacement of the main gear and the auxiliary gear, and thus can be used flexibly and applicable for more situations.

Further, four bolt holes are formed on an end surface of the middle support frame, four counterbores corresponding to the four bolt holes are distributed in the same way and are formed on an end surface of the middle roller, the middle support frame and the middle roller are connected into a whole by penetrating countersunk bolts through the counterbores and matching the countersunk bolts with the bolt holes, and the outer wall of the middle support frame matches with an inner wall side of the middle roller through a groove-shaped surface.

Further, the far-end support frame is circular truncated cone shaped, a tooth-shaped spline hole is arranged at a middle portion of an inner hole thereof, and matches with a tail-end spline of the far-end output shaft. Threaded holes are uniformly distributed on a tail end surface of the far-end output shaft, a circular platen is arranged in an end-surface counterbore in the far-end support fame, and bolts penetrate through the circular platen to be connected in the threaded holes, so as to realize axial fixture between the far-end output shaft and the far end support frame. A group of threaded holes distributed uniformly is formed in an outer end surface of the far end support frame, and the far-end roller and the far-end support frame are connected into a whole through bolts which seal an end cavity of the far-end roller. The arrangement of the circular platen can lower the manufacturing difficulty of the far-end support frame, and the bolts and the circular platen are embedded inside the far-end support frame, resulting in compact assembly and space saving.

Further, the far-end output shaft is a hollow structure, and a rigid water pipe penetrates through the hollow structure. One end of the rigid water pipe is connected on a water inlet end cover, and the other end of the rigid water pipe extends out of a tail end of the far-end output shaft, and is connected with a nozzle in the far-end roller through threads.

Further, the concentric bearing pack is two tapered roller bearings installed oppositely, outer rings of the two tapered roller bearings match with the inner wall of the middle output shaft, and inner rings of the two tapered roller bearings match with a middle section of the far-end output shaft. The locating bearing is a double-row tapered roller bearing, an inner ring of the double-row tapered roller bearing matches with the outer wall of the middle output shaft, and an outer ring of the double-row tapered roller bearing matches with the cutting unit case. Two end surfaces of the locating sleeve respectively contact the inner rings at one side of the concentric bearing pack and the tail-end bearing pack. The middle support frame is a double-cylinder-wall structure, and an inner cylinder wall of the middle support frame matches with an outer bearing ring of the tail-end bearing pack. A group of radial through holes is formed in double cylinder walls of the middle support frame, radial through holes corresponding the radial through holes in the middle support frame are formed in the middle output shaft, and the middle support frame and the middle output shaft are fixed as a whole by inserting axial locating pins into the two groups of through holes. The inner rings and the outer rings of the two bearings in the concentric bearing pack respectively match with the two output shafts, ensuring rotation of the two rollers around a same axial line and the operating stability of the rollers. The locating sleeve helps assemble the bearings, increase the assembly precision, and lower the assembly difficulty. The axial locating pins are design to disassemble the rollers and bear certain shearing force to play a role of overload protection.

Further, two helical vanes are arranged on the far-end roller, have a spiral lead angle of 12° to 20° (small spiral lead angle facilities axial mobility of coal), and are provided with cutting teeth. One to three helical vanes are arranged on an outer wall of the middle roller, have a spiral lead angle of 20° to 30° (to improve the axial conveyance capability of the rollers to coal pieces), and are provided with cutting teeth. The spiral lead angle of the helical vanes on the middle roller is larger than the spiral lead angle of the helical vanes on the far-end roller. A rotation speed of the far-end roller is 1.5-3 times of a rotation speed of the middle roller, and an axial length of the far-end roller is 1-4 times of an axial length of the middle roller. The axial conveying function of the far-end roller dominates, and the part of the far-end roller involved in coal cutting is longer.

Beneficial effects are as follows. Compared to the existing technology, the shearer cutting unit with double-speed rollers provided by the invention has the following advantages.

1. The two rollers can be rotated coaxially in different speeds, among which, the far-end roller has higher rotation speed, higher coal cutting efficiency, smaller lead angle of the helical vanes and larger wrap angle, thus providing better axial mobility, and the middle roller has lower rotation speed and larger spiral lead angle, and thus the middle roller can increase the tangential force and the projection speed, and help complete roller conveyance and coal loading in a better way.

2. Dual-motor driving is used, and can provide larger driving force, compared to single-motor driving. With the same driving force, dual-motor driving can have smaller motor volume and the power of a single motor.

3. Since the middle roller has lower rotation speed and larger lead angle of the helical vanes, the arrangement of the one to three helical vanes does not block the coal conveyance gap at the joint between the two rollers and does not obstruct coal movement. Besides, more helical vanes can ensure the continuity of the force onto the coal pieces, reduce pulsation of spiral conveying, and improve the coal conveying effect of the rollers.

Figure 3:
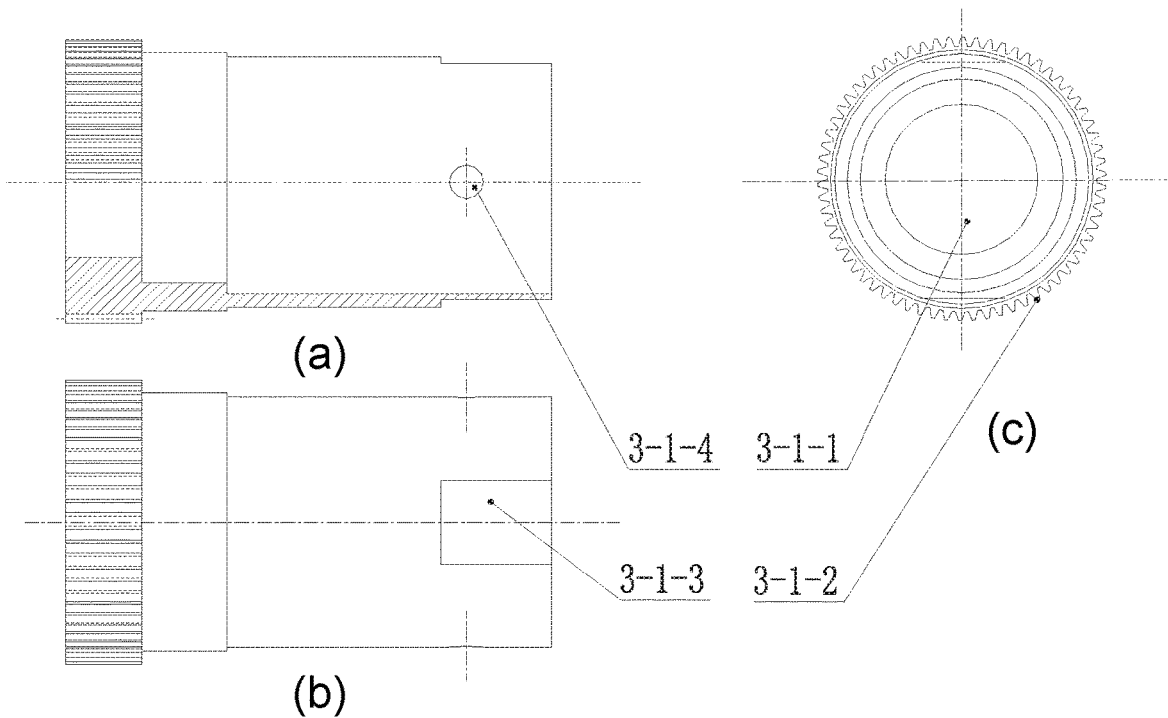
Figure 4:
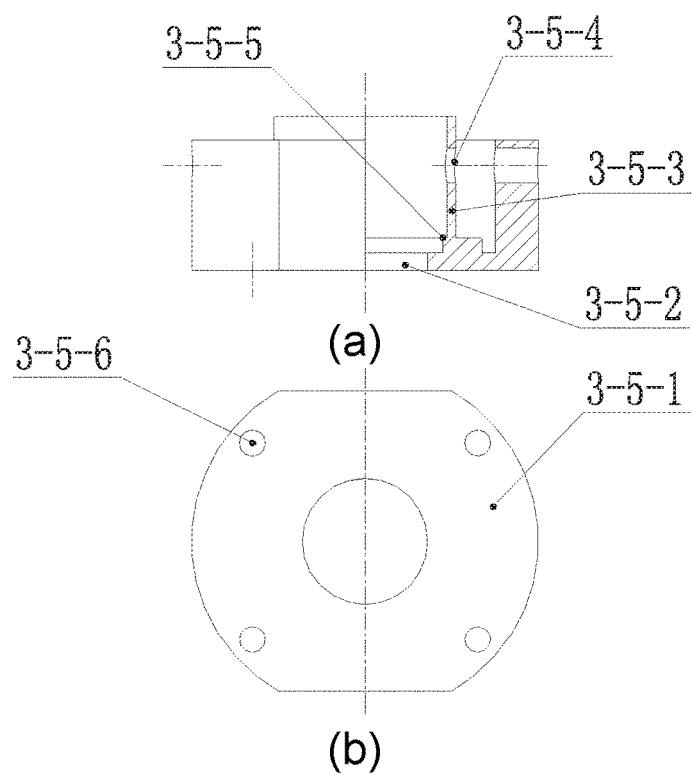
Figure 5:
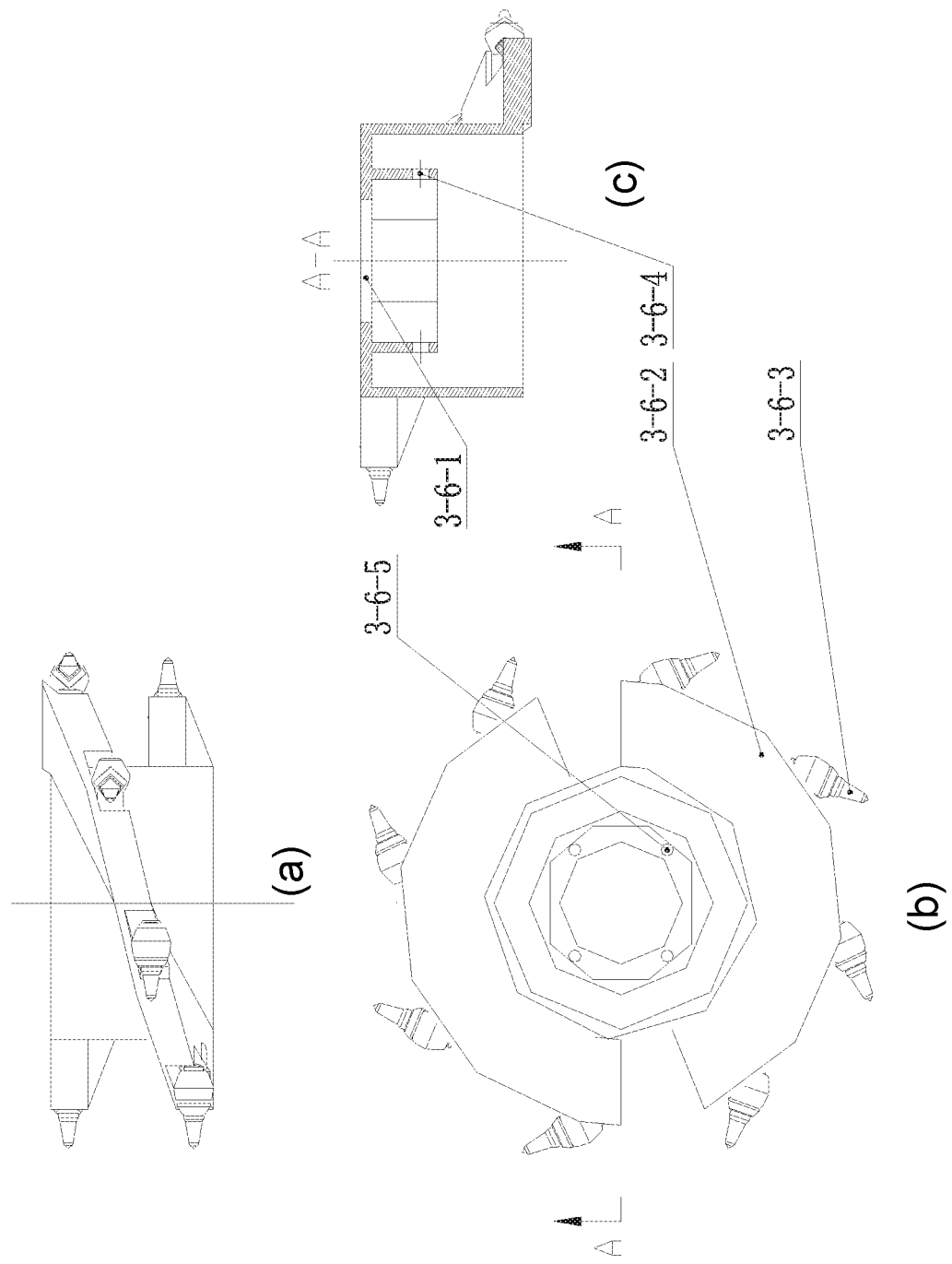
Figure 6:
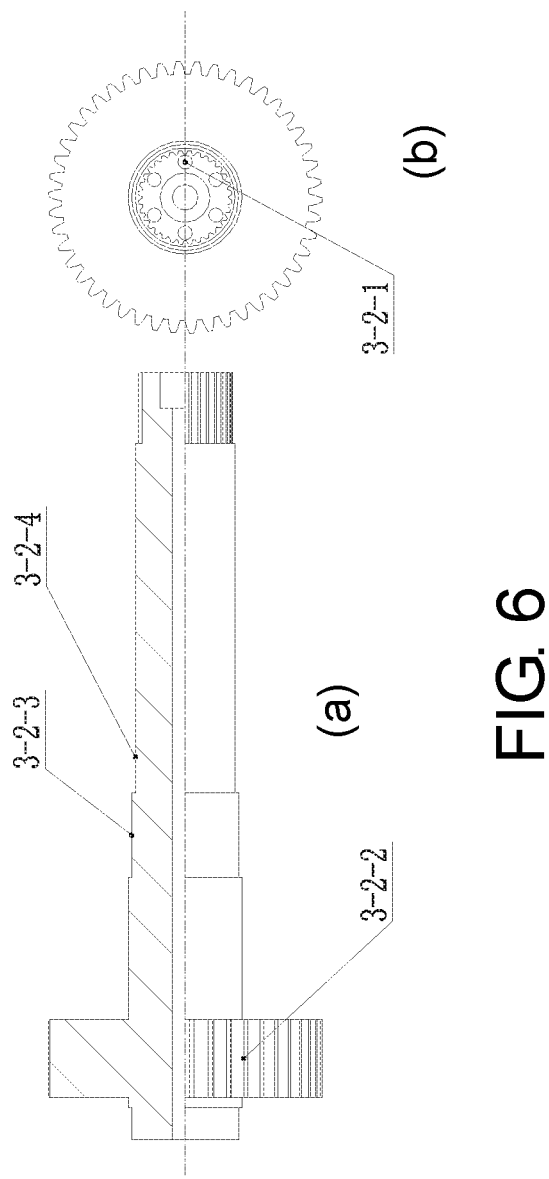
Figure 7:
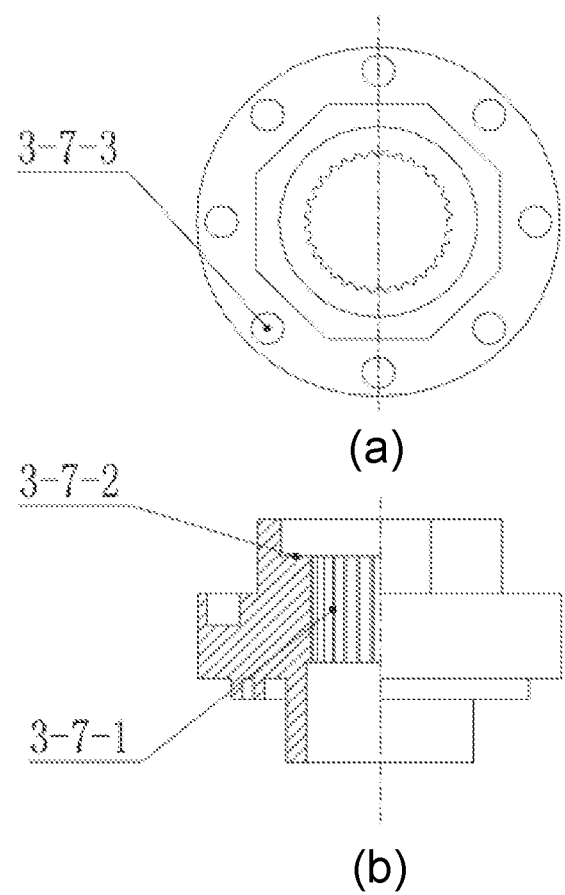

Parts (a), (b) and (c) of FIG. 3 are structural diagrams of a middle output shaft of the invention;

Parts (a) and (b) of FIG. 4 are structural diagrams of a middle support frame of the invention;

Parts (a), (b) and (c) of FIG. 5 are structural diagrams of the middle roller of the invention;

Parts (a) and (b) of FIG. 6 are structural diagrams of a far-end output shaft of the invention; and Parts (a) and (b) of FIG. 7 are structural diagrams of a far-end support frame of the invention.

DESCRIPTION OF THE EMBODIMENTS

The invention will be further explained in combination with the attached drawings.

Figure 1:
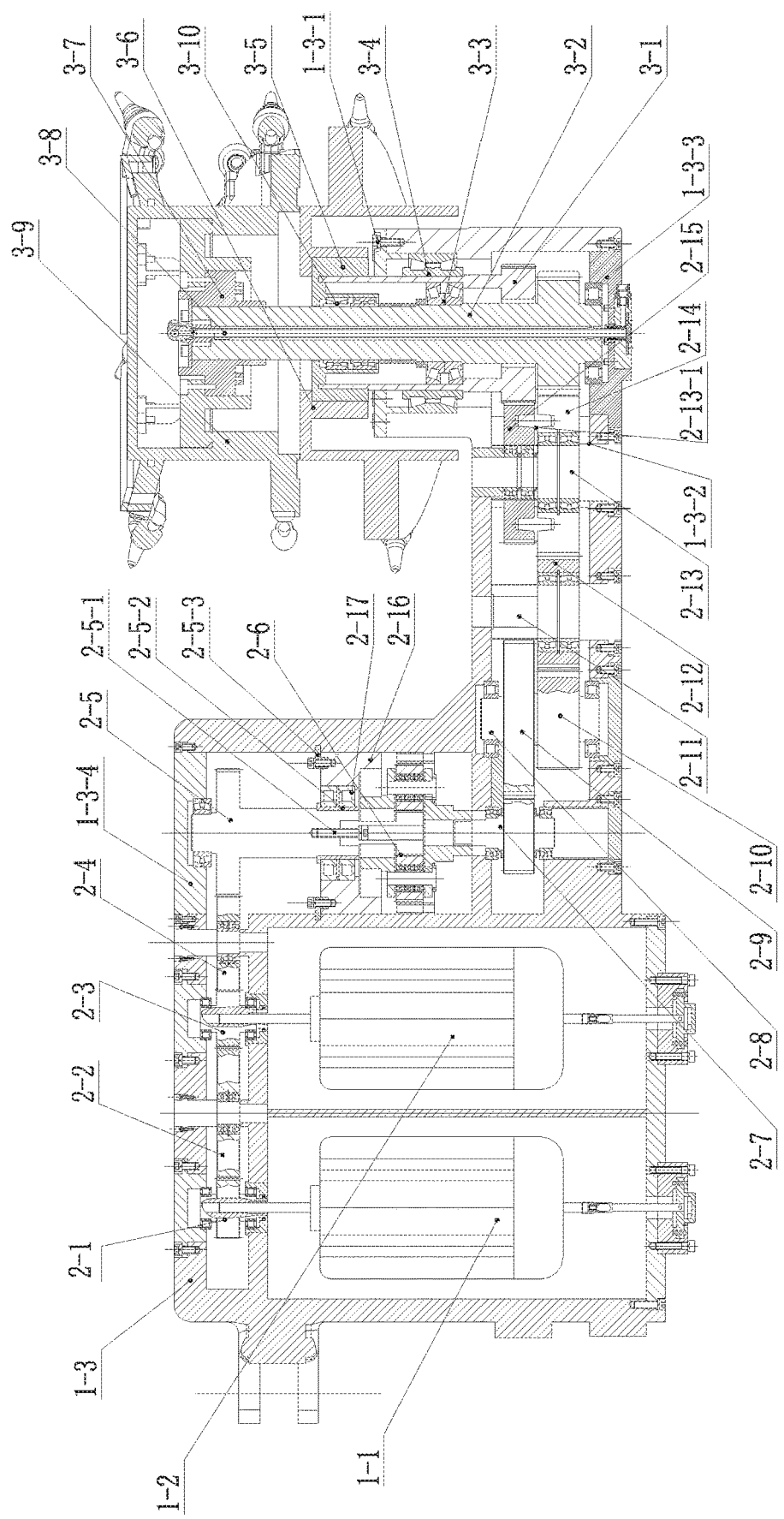
FIG. 1 is a sectional view of a shearer cutting unit with double-speed rollers of the invention.
Figure 2:
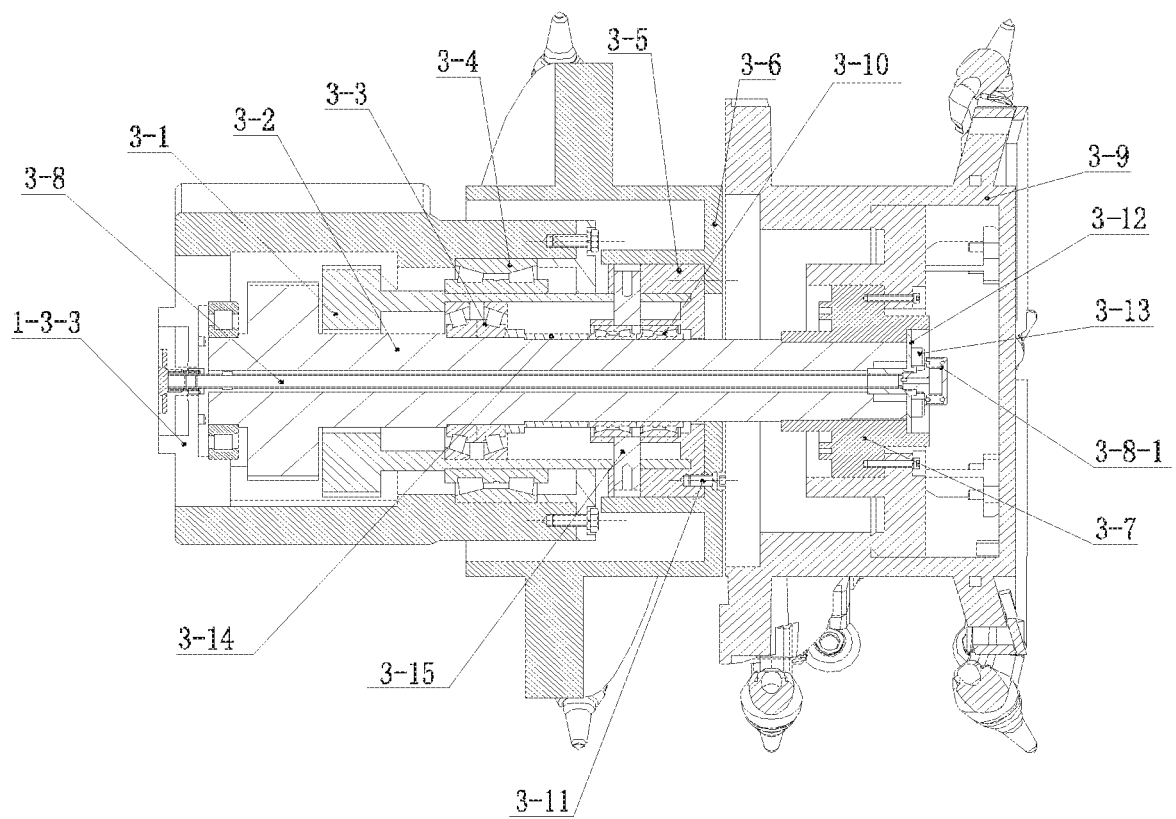
FIG. 2 is a sectional view of a roller output unit of the invention.

A shearer cutting unit with double-speed rollers as shown in FIG. 1 and FIG. 2 comprises a cutting unit case 1-3, a motor driving unit, a gear transmission unit and a roller output unit.

The shearer cutting unit uses dual-motor driving. The motor driving unit comprises a left cutting motor 1-1 and a right cutting motor 1-2 which are both arranged in the cutting unit case 1-3. A plurality of shaft holes are formed on the cutting unit case 1-3, and are covered with end covers. The gear transmission unit comprises a left gear shaft 2-1, a first idle wheel 2-2, a right gear shaft 2-3, a second idle wheel 2-4, a main input shaft 2-5, a planetary gear speed reducer 2-6, a first stage gear shaft 2-7, a second stage gear shaft 2-8, an input gear 2-9, an output gear 2-10, a third stage linear shaft 2-11, a constant-speed gear 2-12, a speed distributing shaft 2-13, a main gear 2-14, an auxiliary gear 2-16, a bearing seat 2-16, and a carrying bearing pack 2-17 which are all arranged inside the cutting unit case 1-3. The roller output unit comprises a middle output shaft 3-1, a far-end output shaft 3-2, a concentric bearing pack 3-3, a locating bearing 3-4, a middle support frame 3-5, a middle roller 3-6, a far-end support frame 3-7, a rigid water pipe 3-8, a far-end roller 3-9, a tail-end bearing pack 3-10, a circular platen 3-12 and various standard bolts.

The first stage of the gear transmission part is the left gear shaft 2-1, in which a spline hole is formed and matches with the shaft-end spline part of the left cutting motor 1-1. The left gear shaft 2-1 is fixed in the shaft hole of the cutting unit case 1-3 via bearings located at the two ends of the shaft, and a gear part of the left gear shaft 2-1 is engaged with the first idle wheel 2-2. The first idle wheel 2-2 is also engaged with a gear part of the right gear shaft 2-3, a same spline hole is formed in the right gear shaft 2-3, and matches with the shaft-end spline part of the right cutting motor 1-2. The right gear shaft 2-3 is fixed in the shaft hole of the cutting unit case 1-3 via bearings located at the two ends of the shaft, the gear part thereof is engaged with the second idle wheel 2-4, and the second idle wheel 2-4 is also engaged with a gear part of the main input shaft 2-5 to transmit the kinetic energy.

The main input shaft 2-5 is a gear shaft with cross-shaped cross section (increasing the transmission distance, reducing the transmission space and providing convenience for assembly). One end of the main input shaft 2-5 close to the gear part thereof is fixed on the first end cover 1-3-4 via a bearing, a spline groove is arranged at a surface of the other end of the main input shaft 2-5 far from the gear part thereof and is provided with a threaded hole, a through hole is formed in an input shaft and an output shaft of the planetary gear speed reducer 2-6 (to provide an assembly space for the bolt 2-5-1), the bolt 2-5-1 is connected with the input shaft of the planetary gear speed reducer 2-6 (by playing a role of fixed connection and axial constraint), and the planetary gear speed reducer 2-6 also matches with the main input shaft 2-5 through a spline. The input shaft and the output shaft of the planetary gear speed reducer 2-6 are in a same axial direction, a spline groove is arranged on the output shaft of the planetary gear speed reducer 2-6, and matches with the spline part on the first stage gear shaft 2-7.

The first stage gear shaft 2-7 is a stepped shaft, a spline is arranged at one end thereof close to the planetary gear speed reducer 2-6, and the two ends thereof are respectively fixed in the cutting unit case 1-3 through a double-row tapered roller bearing. The gear part of the first stage gear shaft 2-7 is engaged with the input gear 2-9 on the second stage gear shaft 2-8, and a tooth number of the input gear 2-9 is 1.5-2.5 times of a tooth number of the gear part on the first stage gear shaft 2-7 (with a transmission ratio of 1.5-2.5 to realize speed reduction).

The second stage gear shaft 2-8 is a stepped gear shaft, the two ends thereof are fixed on the cutting unit case 1-3 through bearings, two gears are arranged in the middle of the shaft section thereof, among which a gear with larger radius is the input gear 2-9, and a gear with smaller radius is the output gear 2-10, diameters and modules of the input gear 2-9 and the output gear 2-10 are both different, the diameter of the input gear 2-9 is 1.5-2.5 times of the diameter of the output gear 2-10 (with a transmission ratio of 1.5-2.5 to realize speed reduction), and the module of the output gear 2-10 is 1.5-2 times of the module of the input gear 2-9 (with a transmission ratio of 1.5-2.5 to realize speed reduction). The output gear 2-10 on the second stage gear shaft 2-8 is engaged with the constant-speed gear 2-12 on the third stage linear shaft 2-11, the constant-speed gear 2-12 is sleeved on the third stage linear shaft 2-11 through a bearing, and is also engaged with the main gear 2-14 on the speed distributing shaft 2-13.

The speed distributing shaft 2-13 is a spindle, the spindle is stepped, the section with the smallest diameter thereof is fixed in the shaft hole of the cutting unit case 1-3 through a shaft sleeve, the two sections with large diameter penetrate through the stepped hole 1-3-2 on the cutting unit case 1-3, the section with the largest diameter is provided with threaded holes around the section, and is fixed in the stepped hole 1-3-2 of the cutting unit case 1-3 through a bolt, and the two ends of the speed distributing shaft 2-13 are fixed with the cutting unit case 1-3 through end covers. Two groups of double-row tapered roller bearings are installed on the speed distributing shaft 2-13 (to improve the load carrying capability of the bearing), each having two double-row tapered roller bearings, among which one group is located on the side close to the coal wall, and the outer bearing rings of the group match with the auxiliary gear 2-15, the other group is located on the side far away from the coal wall, and the outer bearing rings of the group match with the main gear 2-14.

The gear part 3-1-2 of the middle output shaft 3-1 is engaged with the auxiliary gear 2-15 on the speed distributing shaft 2-13, and a tooth number of the gear part 3-1-2 is larger than a tooth number of the auxiliary gear 2-15. The middle output shaft 3-1 is cylindrical (such that other components like the far-end output shaft penetrate through the middle output shaft to utilize the space reasonably), and the concentric bearing pack 3-3 and the locating bearing 3-4 are respectively fixed on the shoulders of an inner wall and an outer wall in a middle portion of the cylinder (i.e., cylindrical body of the middle output shaft 3-1). A tail end of the middle output shaft 3-1 matches with an inner wall of the middle support frame 3-5. Four bolt holes 3-5-6 are formed on an end surface of the middle support frame 3-5, four counterbores 3-6-5 corresponding the four bolt holes 3-5-6 are distributed in the same way and are formed on an end surface of the middle roller 3-6, the middle support frame 3-5 and the middle roller 3-6 are connected into a whole by penetrating countersunk bolts 3-11 through the counterbores 3-6-5 and matching the countersunk bolts 3-11 with the bolt holes 3-5-6, and an outer wall of the middle support frame 3-5 matches with an inner wall side of the middle roller 3-6 through a groove-shaped surface.

The far-end output shaft 3-2 is a gear shaft with cross-shaped cross section, and the gear part 3-2-2 thereof is located on the shaft side which is an end far away from the cutting roller. One end of the far-end output shaft 3-2 close to the gear part 3-2-2 is fixed on the water inlet end cover 1-3-3 via a bearing, the gear part thereof is engaged with the main gear 2-14, and a tooth number of the gear part is smaller than a tooth number of the main gear 2-14 (to increase the speed). The other end of the far-end output shaft 3-2 is a tail end of the shaft, at which a tooth-shaped spline is arranged. The linear shaft part of the far-end output shaft 3-2 is long, with a diameter smaller than a diameter of the gear part of the shaft. From the gear end to the tail end, the far-end output shaft 3-2 penetrates through the middle roller 3-6, the concentric bearing pack 3-3, the locating sleeve 3-14, the tail-end bearing pack 3-10 and the far-end support frame 3-7 in sequence. The far-end support frame 3-7 is circular truncated cone shaped, and a tooth-shaped spline hole 3-7-1 is arranged at the middle of the inner hole thereof, to be used for matching with the tail-end spline of the far-end output shaft 3-2.

As shown in parts (a) and (b) of FIG. 7, a group of threaded holes 3-7-3 distributed uniformly is formed on an end surface of the far end support frame 3-7 toward the coal wall, and the far-end roller 3-9 and the far-end support frame 3-7 are connected into a whole through bolts which also seal the end cavity of the far-end roller 3-9 (to prevent foreign substances like crushed coal from entering the end cavity, and provide a sealed space for the liquid of a spray system). Two helical vanes are arranged on the far-end roller 3-9, have a spiral lead angle of 12° to 20°, and are provided with cutting teeth (small spiral lead angle facilities axial mobility of coal.

Gear shaft lines of the left gear shaft 2-1, the first idle wheel 2-2, the right gear shaft 2-3, the second idle wheel 2-4 and the main input shaft 2-5 are mutually parallel, gear end surfaces thereof are located on a same plane, and are arranged in the cutting unit case 1-3 on a side close to the coal wall, thus changing the power transmission path of the traditional cutting unit rocker arm, and leaving sufficient space for the arrangement of the speed reducer and the rollers.

A shoulder is arranged on a section at the end of the main input shaft 2-5 far from the gear, and is used for installing the carrying sleeve 2-5-2. An outer wall of the carrying sleeve 2-5-2 matches with an inner ring of the carrying bearing pack 2-17. The carrying bearing pack 2-17 is two cylindrical roller bearings, and outer bearing rings of the cylindrical roller bearings are fixed in the bearing seat 2-16. A pair of threaded holes is formed on the casing of the bearing seat 2-16, the locating fin plate 2-5-3 is installed on the casing through a bolt, and is also installed in a specific groove of the cutting unit case 1-3 (to restrict the position of the carrying bearing pack 2-17 on the cutting unit case 1-3, and provide a locating end surface necessary for assembly for the planetary gear speed reducer 2-6).

The main gear 2-14 and the auxiliary gear 2-15 are installed on the speed distributing shaft 2-13 side by side, and the same taper holes are formed on the adjacent spoke surfaces. The taper holes have exactly the same distribution radius, size and quantity on the two gears. The two gears are connected into a whole through matching between a double-cone locating pin 2-13-1 and the taper holes in the main gear 2-14 and the auxiliary gear 2-15, so that the power is transmitted from the main gear 2-14 to the auxiliary gear 2-15, and the movement of the two gears is completely consistent.

As shown in parts (a), (b) and (c) of FIG. 3, the middle output shaft 3-1 is a gear shaft structure, which is hollow cylindrical shaped, formed with the axial through hole 3-1-1, installed at the tail end of the cutting unit case 1-3, and arranged in a same axial direction as the cutting roller. The gear part 3-1-2 of the middle output shaft 3-1 is located at one end far from the cutting roller. Two mutually parallel matching planes 3-1-3 are arranged on the outer wall of the middle output shaft 3-1 extending out of the main shaft end cover 1-3-1, and the middle support frame 3-5 matches with the matching planes 3-1-3, so as to restrict the relative rotation of the middle support frame 3-5 to a peripheral direction of the middle output shaft 3-1. The middle output shaft 3-1 and the middle support frame 3-5 are connected through the bolt on an end surface, and also mutually match through the matching planes 3-1-3, the matching planes 3-1-3 can allow the matching to be closer, the middle support frame to bear larger circumferential torque and to be under more uniform pressure, reduce the shearing force borne by the bolt, and improve the equipment reliability and service life.

As shown in parts (a) and (b) of FIG. 6, six threaded holes 3-2-1 are formed on a tail end surface of the far-end output shaft 3-2, bolts 3-13 penetrate through the six through holes in the circular platen 3-12, and are assembled on the six threaded holes 3-2-1 (to restrict the axial relative movement between the far-end output shaft 3-2 and the far end support frame 3-7). The circular platen is assembled in an end-surface counterbore 3-7-2 in the far-end support fame 3-7.

The far-end output shaft 3-2 is a hollow structure, through which a rigid water pipe 3-8 penetrates. One end of the water pipe 3-8 is connected on a water inlet end cover 1-3-3, and the other end of the water pipe 3-8 extends out of the tail end of the far-end output shaft 3-2, and is connected with a nozzle 3-8-1 through thread. The nozzle is located at the tail end of the low-speed shaft, and is enclosed in the inner cavity of the far-end roller 3-9 to provide water for the spray system of the far-end roller 3-9, while no nozzle is installed on the middle roller 3-6.

The concentric bearing pack 3-3 is two tapered roller bearings installed oppositely, outer rings of the two tapered roller bearings match with an inner wall of the middle output shaft 3-1, and inner rings of the two tapered roller bearings match with an outer diameter of the middle section 3-2-3 of the far-end output shaft 3-2. The locating bearing 3-4 is a double-row tapered roller bearing, an inner ring thereof matches with the outer wall of the middle output shaft 3-1, and an outer ring thereof matches with the cutting unit case 1-3.

The locating bearing 3-4 is located at the tail end of the cutting unit case 1-3, and the outer ring of the locating beating 3-4 is located through the main shaft end cover 1-3-1. The main shaft end cover 1-3-1 is fixed at the tail end of the cutting unit case 1-3 through a bolt, and the diameter of the through hole formed at a center of the main shaft end cover 1-3-1 is slightly larger than the outer diameter of the middle output shaft 3-1. One end of the middle output shaft 3-1 far way from the gear part extends out of the through hole in the main shaft end cover 1-3-1.

As shown in parts (a) and (b) of FIG. 4, the casing 3-5-1 of the middle support frame 3-5 has groove-shaped cross section and has a double-cylinder-wall structure. Namely, the entire casing 3-5-1 is cylindrical and is formed with an axial through hole 3-5-2, and a section of inner cylinder wall 3-5-3 is arranged in the cylinder. An inner diameter of the inner cylinder wall 3-5-3 is slightly larger than the diameter of the through hole on the end surface, the outer diameter thereof is smaller than an inner diameter of the main cylinder wall, the inner cylinder wall 3-5-3 is used for matching with the outer bearing ring of the tail-end bearing pack 3-10, and restricting the outer bearing ring of the tail-end bearing pack 3-10 via the stepped shoulder 3-5-5 on an inner wall of the inner cylinder wall 3-5-3. A group of radial through holes 3-5-4 is formed in the middle support frame 3-5. The same radial through holes 3-1-4 are formed in the middle output shaft 3-1, the two groups of through holes are arranged in the same radial direction, and two axial locating pins 3-15 are respectively inserted into the two groups of through holes from the two sides of the two groups, so as to fix the middle support frame 3-5 and the middle output shaft 3-1 into a whole and restrict the axial relative movement between the middle support frame 3-5 and the middle output shaft 3-1.

As shown in parts (a), (b) and (c) of FIG. 5, the middle roller 3-6 is a double-cylinder-wall structure, in which an axial through hole 3-6-1 is formed, the outer cylinder wall extends away from the coal wall, and encloses the tail end part of the cutting unit case 1-3 in the cylinder body, and two radial through holes 3-6-4 are formed on the inner cylinder wall, to provide an assembly space for the axial locating pins 3-15. One to three helical vanes 3-6-2 are arranged on an outer wall of the middle roller 3-6, have a spiral lead angle of 20° to 30°, and are provided with cutting teeth 3-6-3 (to improve the axial conveyance capability of the rollers to coal pieces).

The locating sleeve 3-14 is installed at one end of the longest section 3-2-4 of the far-end output shaft 3-2. Two end surfaces of the locating sleeve 3-14 respectively contact the inner rings at one side of the concentric bearing pack 3-3 and the tail-end bearing pack 3-10.

The rotation speed of the far-end roller 3-6 is 1.5-3 times of the rotation speed of the middle roller 3-9. The spiral lead angle of the helical vanes on the middle roller 3-6 is larger than the spiral lead angle of the helical vanes on the far-end roller 3-9. An axial length of the far-end roller 3-9 is 1-4 times of an axial length of the middle roller. The axial conveying function of the far-end roller dominates, and the part of the far-end roller involved in coal cutting is longer.

In the shearer cutting unit with double-speed rollers provided by the invention, a cutting roller is separated into a far-end roller and a middle roller, and the two rollers can rotate coaxially in different speeds. The far-end roller close to the coal wall has higher rotation speed, higher coal cutting efficiency, smaller lead angle of the helical vanes and larger wrap angle, thus providing larger axial force and better axial mobility for the coal pieces. The middle roller has lower rotation speed and larger spiral lead angle, and thus can provide a larger tangential force for coal pieces delivered to the middle roller, increase the projection speed, help the coal pieces fall on the scraper conveyor in a better way, and reduce float coal. Since the middle roller has lower rotation speed and larger lead angle of the helical vanes, the arrangement of the one to three helical vanes does not block the coal conveying gap at the joint between the two rollers and does not obstruct coal movement. Besides, more helical vanes can ensure the continuity of the force onto the coal pieces, reduce pulsation of spiral conveying, and improve the coal conveying effect of the rollers.

The above description is only a preferred implementation of the invention. It shall be pointed out that many improvements and modifications can be made by one of ordinary skill in the technical field without departing from the principle of the invention, which shall also be regarded as falling within the scope of protection of the invention.

What is claimed is:

1. A shearer cutting unit with double-speed rollers, the shearer cutting unit comprising a cutting unit case, a motor driving unit, a gear transmission unit and a roller output unit;

wherein the motor driving unit comprises a left cutting motor and a right cutting motor, which are both arranged in the cutting unit case; the gear transmission unit comprises a left gear shaft, a first idle wheel, a right gear shaft, a second idle wheel, a main input shaft, a planetary gear speed reducer, a first stage gear shaft, a second stage gear shaft, an input gear, an output gear, a third stage linear shaft, a constant-speed gear, a speed distributing shaft, a main gear and an auxiliary gear which are all arranged inside the cutting unit case;

the left gear shaft is connected with an output shaft of the left cutting motor in a matching manner, and a gear part of the left gear shaft is engaged with the first idle wheel; the first idle wheel is engaged with a gear part of the right gear shaft, and the right gear shaft is connected with an output shaft of the right cutting motor in a matching manner; the right gear shaft is further engaged with the second idle wheel, and the second idle wheel is further engaged with a gear part of the main input shaft; the main input shaft is a gear shaft, and one end of the main input shaft far from the gear part thereof is connected with an input shaft of the planetary gear speed reducer in a matching manner; the input shaft and an output shaft of the planetary gear speed reducer are in a same axial direction, and the output shaft of the planetary gear speed reducer is connected with the first stage gear shaft in a matching manner; a gear part of the first stage gear shaft is engaged with the input gear on the second stage gear shaft, and two gears are arranged on the second stage gear shaft, among the two gears, a gear with larger radius is the input gear, and a gear with smaller radius is the output gear; the output gear on the second stage gear shaft is engaged with the constant-speed gear on the third stage linear shaft, and the constant-speed gear is further engaged with the main gear on the speed distributing shaft;

the roller output unit comprises a middle output shaft, a far-end output shaft, a concentric bearing pack, a locating bearing, a middle support frame, a middle roller, a far-end support frame, a far-end roller, a tail-end bearing pack and a locating sleeve; and a gear part of the middle output shaft is engaged with the auxiliary gear on the speed distributing shaft, and a tooth number of the gear part is larger than a tooth number of the auxiliary gear; the middle output shaft is cylindrical, and the concentric bearing pack and the locating bearing are respectively fixed on shoulders of an inner wall and an outer wall of the middle output shaft; a tail end of the middle output shaft matches with an inner wall of the middle support frame, and an outer wall of the middle support frame is fixedly connected with an inner wall of the middle roller; the far-end output shaft is a gear shaft, the gear part of the far-end output shaft is engaged with the main gear, and a tooth number of the gear part of the far-end output shaft is smaller than a tooth number of the main gear; an end of the far-end output shaft far from the gear part thereof penetrates through the middle roller, the concentric bearing pack, the locating sleeve and the tail-end bearing pack in sequence and matches with the far-end support frame, and an outer wall of the far-end support frame is connected with an inner wall of the far-end roller in a matching manner.

2. The shearer cutting unit with double-speed rollers according to claim 1, wherein matching connections are realized between the left gear shaft and the output shaft of the left cutting motor, between the right gear shaft and the output shaft of the right cutting motor, and between the output shaft of the planetary gear speed reducer and the first stage gear shaft through splines; and a spline groove is arranged at the end of the main input shaft far from the gear part thereof and is provided with a threaded hole, a through hole is formed in the input shaft and the output shaft of the planetary gear speed reducer, a bolt penetrating through the through hole is connected in the threaded hole and connected with the input shaft of the planetary gear speed reducer, and the planetary gear speed reducer matches with the main input shaft through a spline.

3. The shearer cutting unit with double-speed rollers according to claim 1, wherein a shoulder is arranged on a section at the end of the main input shaft far from the gear part thereof, and the shoulder is provided with a carrying sleeve; a carrying bearing pack is sleeved outside the carrying sleeve, and a bearing seat is arranged at an outer bearing ring of the carrying bearing pack; a pair of threaded hole is formed in the bearing seat, and is fixedly connected with a locating fin plate installed on the cutting unit case through bolts.

4. The shearer cutting unit with double-speed rollers according to claim 1, wherein a tooth number of the input gear is 1.5-2.5 times of a tooth number of the gear on the first stage gear shaft; a diameter of the input gear is 1.5-2.5 times of a diameter of the output gear, and a module of the output gear is 1.5-2 times of a module of the input gear.

5. The shearer cutting unit with double-speed rollers according to claim 1, wherein the speed distributing shaft is a spindle, and two groups of double-row tapered roller bearing are installed on the spindle, each groups having two double-row tapered roller bearings, outer bearing rings of one group of double-row tapered roller bearing match with the auxiliary gear, and outer bearing rings of the other group of double-row tapered roller bearing match with the main gear; and the main gear and the auxiliary gear are installed on the speed distributing shaft side by side, corresponding taper holes are formed on adjacent spoke surfaces of the main gear and the auxiliary gear, and the main gear and the auxiliary gear are connected into a whole through matching between a double-cone locating pin and the taper holes in the main gear and the auxiliary gear.

6. The shearer cutting unit with double-speed rollers according to claim 1, wherein four bolt holes are formed on an end surface of the middle support frame, four counterbores corresponding to the four bolt holes are distributed in the same way and are formed on an end surface of the middle roller, the middle support frame and the middle roller are connected into a whole by penetrating countersunk bolts through the counterbores and matching the countersunk bolts with the bolt holes, and the outer wall of the middle support frame matches with an inner wall side of the middle roller through a groove-shaped surface.

7. The shearer cutting unit with double-speed rollers according to claim 1, wherein the far-end support frame is circular truncated cone shaped, a tooth-shaped spline hole is arranged at a middle portion of an inner hole thereof, and matches with a tail-end spline of the far-end output shaft; threaded holes are uniformly distributed on a tail end surface of the far-end output shaft, a circular platen is arranged in an end-surface counterbore in the far-end support frame, and bolts penetrate through the circular platen to be connected in the threaded holes, so as to realize axial fixture between the far-end output shaft and the far end support frame; a group of threaded holes distributed uniformly is formed in an outer end surface of the far end support frame, and the far-end roller and the far-end support frame are connected into a whole through bolts which seal an end cavity of the far-end roller.

8. The shearer cutting unit with double-speed rollers according to claim 1, wherein the far-end output shaft is a hollow structure, a rigid water pipe penetrates through the hollow structure; one end of the rigid water pipe is connected on a water inlet end cover, the other end of the rigid water pipe extends out of a tail end of the far-end output shaft, and is connected with a nozzle in the far-end roller through threads.

9. The shearer cutting unit with double-speed rollers according to claim 1, wherein the concentric bearing pack is two tapered roller bearings installed oppositely, outer rings of the two tapered roller bearings match with the inner wall of the middle output shaft, and inner rings of the two tapered roller bearings match with a middle section of the far-end output shaft; the locating bearing is a double-row tapered roller bearing, an inner ring of the double-row tapered roller bearing matches with the outer wall of the middle output shaft, and an outer ring of the double-row tapered roller bearing matches with the cutting unit case; and two end surfaces of the locating sleeve respectively contact the inner rings at one side of the concentric bearing pack and the tail-end bearing pack; the middle support frame is a double-cylinder-wall structure, and an inner cylinder wall of the middle support frame matches with an outer bearing ring of the tail-end bearing pack; a group of radial through holes is formed in double cylinder walls of the middle support frame, radial through holes corresponding the radial through holes in the middle support frame are formed in the middle output shaft, and the middle support frame and the middle output shaft are fixed as a whole by inserting axial locating pins into the radial through holes in the middle support frame and the radial through holes in the middle output shaft.

10. The shearer cutting unit with double-speed rollers according to claim 1, wherein two helical vanes are arranged on the far-end roller, have a spiral lead angle of 12° to 20°, and are provided with cutting teeth; one to three helical vanes are arranged on an outer wall of the middle roller, have a spiral lead angle of 20° to 30°, and are provided with cutting teeth; and the spiral lead angle of the helical vanes on the middle roller is larger than the spiral lead angle of the helical vanes on the far-end roller; a rotation speed of the far-end roller is 1.5-3 times of a rotation speed of the middle roller, and an axial length of the far-end roller is 1-4 times of an axial length of the middle roller.

\* \* \* \* \*